US008907926B2

(12) United States Patent
Wang (10) Patent No.: US 8,907,926 B2
(45) Date of Patent: Dec. 9, 2014

(54) METHOD FOR CALIBRATING ACCURACY OF OPTICAL TOUCH MONITOR

(75) Inventor: Chun-Wei Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 470 days.

(21) Appl. No.: 13/198,727

(22) Filed: Aug. 5, 2011

(65) Prior Publication Data

US 2012/0235956 A1 Sep. 20, 2012

(30) Foreign Application Priority Data

Mar. 14, 2011 (TW) .............................. 100108517 A (51) Int. Cl.
G06F 3/042 (2006.01)
G06F 3/041 (2006.01)

(52) U.S. Cl.
CPC ............ *G06F 3/0418* (2013.01); *G06F 3/0421* (2013.01)
USPC ........................................................ 345/175

(58) Field of Classification Search
USPC ........................... 345/156, 157, 173, 175, 178
See application file for complete search history.

(56) References Cited

U.S. PATENT DOCUMENTS

| 2009/0161945 A1* | 6/2009 | Morgan-Mar et al. | 382/154 |
| 2011/0050640 A1* | 3/2011 | Lundback et al. | 345/175 |
| 2011/0122093 A1* | 5/2011 | Jeong et al. | 345/175 |
| 2012/0057053 A1* | 3/2012 | Mallon et al. | 348/241 |
| 2012/0133616 A1* | 5/2012 | Nishihara et al. | 345/175 |

OTHER PUBLICATIONS

Zitova et al., "Image registration methods: a survey", Image and Vision Computing 21 (2003) p. 977-p. 1000.
Arad et al., "Image Warping Using few Anchor Points and Radial Functions", CVGIP: Graphical Models and Image Processing 56 (1994) p. 1-p. 12.
David N. Fogel, "Image rectification with radial basis functions: Application to RS/GIS data integration", Proceedings of the Third International Conference on Integrating GIS and Environmental Modelling, Santa Fe, New Mexico, 1996, p. 1-p. 28.
Ardeshir Goshtasby, "Registration of Images With Geometric Distortions", IEEE Transactions on Geoscience and Remote Sensing, vol. 26, No. 1, Jan. 1998, p. 60-p. 64.
Wiemker et al., "Application of Elastic Registration to Imaginery From Airborne Scanners", International Archives for Photogrammetry and Remote Sensing XXXI, Part B, Commission IV (1996) p. 1-p. 6.

* cited by examiner

*Primary Examiner* — William Boddie
*Assistant Examiner* — Jeffrey A Parker
(74) *Attorney, Agent, or Firm* — Jianq Chyun IP Office (57) ABSTRACT

A method for calibrating the accuracy of an optical touch monitor is provided. The optical touch monitor has a first lens and a second lens disposed at the same side of the optical touch monitor and faced towards the other side thereof. In the present method, one of a plurality of control points (CPs) on the optical touch monitor is touched by using a touch object. A first position and a second position of the touch object in images captured by the first lens and the second lens are substituted into a non-linear transformation function to calculate a weight matrix for system transformation. When the touch object touches a touch point on the optical touch monitor, a touch position of the touch object on the optical touch monitor is detected and transformed into screen coordinates of the optical touch monitor by using the weight matrix and the non-linear transformation function.

10 Claims, 7 Drawing Sheets

METHOD FOR CALIBRATING ACCURACY OF OPTICAL TOUCH MONITOR

CROSS-REFERENCE TO RELATED APPLICATION

This application claims the priority benefit of Taiwan application serial no. 100108517, filed on Mar. 14, 2011. The entirety of the above-mentioned patent application is hereby incorporated by reference herein and made a part of specification.

BACKGROUND OF THE INVENTION

1. Field of the Invention

The invention generally relates to a method for calibrating a touch monitor, and more particularly, to a method for calibrating the accuracy of an optical touch monitor.

2. Description of Related Art

Along with the widespread of Windows 7 operating system, multi-touch all-in-one PC (AIO PC) has gradually become the mainstream product in the market. Capacitive touch monitor offers the best touch control effect among all existing resistive, capacitive, and rear projection touch monitors. However, it has the highest cost and will become less economical along with the increase of screen size.

In order to find a substitution for capacitive touch monitor, an optical touch monitor in which a touch position is detected by using a light-sensitive device or an optical lens is provided. Such optical touch monitor offers low cost and high accuracy and therefore is very competitive among all monitor products. Accordingly, it has become one of the most popular large-scale touch monitors.

In an optical touch monitor, the reflected light blocked by a user's finger is usually detected by using a plurality of light-sensitive devices or optical lenses, and the information detected by foregoing devices is then transformed into coordinates on the screen, so that a finger touch control function can be accomplished. Herein the optical touch monitor usually adopts a linear system and transforms the detected information into screen coordinates by using a linear coordinates transformation algorithm.

Figure 1:
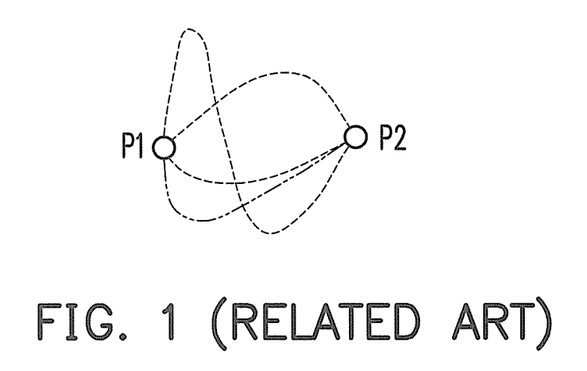
FIG. 1 illustrates an example of connections between two points in a conventional non-linear system.

However, there may be an unlimited number of possibilities regarding the connection between two points (for example, as shown in FIG. 1, the connections between the points P1 and P2) when a non-linear system is actually adopted. In this case, calculation errors may be produced and the transformation result may not meet the actual requirement if the transformation model is still constructed by using the conventional interpolation technique.

SUMMARY OF THE INVENTION

Accordingly, the invention is directed to a method for calibrating the accuracy of an optical touch monitor, wherein position information of where a touch object touches the optical touch monitor is transformed by using a non-linear function, so as to obtain an accurate transformation result.

The invention provides a method for calibrating the accuracy of an optical touch monitor. The optical touch monitor has a first lens and a second lens, wherein the first lens and the second lens are disposed at the same side of the optical touch monitor and faced towards the other side of the optical touch monitor. In the present method, one of a plurality of control points (CPs) on the optical touch monitor is touched by using a touch object, and a first image and a second image are respectively captured by using the first lens and the second lens. Then, a first position and a second position of the touch object in the first image and the second image are respectively detected. Next, the touch object is moved to touch the other CPs on the optical touch monitor, and foregoing steps are repeated to obtain the first position and the second position of the touch object in the first image and the second image when the touch object touches each of the CPs. Thereafter, the first position and the second position of the touch object obtained when the touch object touches each of the CPs are substituted into a non-linear transformation function to calculate a weight matrix for system transformation, wherein the non-linear transformation function includes an affine transform function and a radial basis function (RBF). When the touch object touches a touch point on the optical touch monitor, a touch position of the touch object on the optical touch monitor is detected and transformed into a screen coordinates of the optical touch monitor by using the weight matrix and the non-linear transformation function.

According to an embodiment of the invention, in the step of substituting the first position and the second position of the touch object obtained when the touch object touches each of the CPs into the non-linear transformation function to calculate the weight matrix for system transformation, a spatial position matrix is constructed by using spatial coordinates corresponding to positions of the CPs on the optical touch monitor. Then, the first position and the second position of each of the CPs are substituted into the affine transform function as an image position coordinates to construct an image position matrix. Next, a distance between every two of the CPs is calculated and substituted into the RBF to construct a radial basis matrix. Eventually, the spatial position matrix, the image position matrix, and the radial basis matrix are substituted into the non-linear transformation function to obtain the weight matrix.

According to an embodiment of the invention, in the step of detecting the touch position of the touch object on the optical touch monitor and transforming the touch position into the screen coordinates of the optical touch monitor by using the weight matrix and the non-linear transformation function, the first image and the second image are respectively captured by using the first lens and the second lens, and the first position and the second position of the touch object in the first image and the second image are respectively detected and served as the touch position. Then, the touch position is substituted into the affine transform function as an image position coordinates to construct an image position matrix. Next, a distance between the touch point and each of the CPs is calculated and substituted into the RBF to construct a radial basis matrix. Eventually, the image position matrix, the radial basis matrix, and the weight matrix are substituted into the non-linear transformation function to transform the touch position into the screen coordinates of the optical touch monitor.

According to an embodiment of the invention, the RBF includes a Gaussian function, a multiquadric function, a polyharmonic spline function, or a thin plate spline (TPS) function.

According to an embodiment of the invention, the RBF is a product of a logarithm of a distance between any two sampling points and the $n^{th}$ power of the distance, wherein the two sampling points include the CP or the touch point, and n is a positive integer.

According to an embodiment of the invention, the first lens and the second lens are disposed at two corners of the same side of the optical touch monitor.

According to an embodiment of the invention, the optical touch monitor further includes a third lens and a fourth lens, wherein the first lens and the second lens are disposed at two corners of an upper portion of the optical touch monitor for detecting and calibrating the touch position of the touch object on a lower portion of the optical touch monitor, and the third lens and the fourth lens are disposed at two corners of the lower portion of the optical touch monitor for detecting and calibrating the touch position of the touch object on the upper portion of the optical touch monitor.

According to an embodiment of the invention, the CPs are distributed within a peripheral area and a central area of the optical touch monitor, and the density of the CPs in the peripheral area is greater than the density of the CPs in the central area.

According to an embodiment of the invention, in the step of respectively detecting the first position and the second position of the touch object in the first image and the second image, the touch object is identified in the first image and the second image, and coordinates of the touch object in the X direction in the first image and the second image are served as the first position and the second position.

According to an embodiment of the invention, in the step of identifying the touch object in the first image and the second image, an image processing is performed on the first image and the second image to identify the touch object, wherein the image processing comprises one or a combination of rotation, shifting, and shear deformation.

As described above, the invention provides a method for calibrating the accuracy of an optical touch monitor, wherein the deformation of a touch position detected on the optical touch monitor is taken into consideration by adopting a RBF with non-linear transformation characteristic so that the coordinates transformation result of the optical touch monitor can be made to satisfy the actual requirement without producing any error.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

An optical touch control technique is to read the position of a touch object in an image by using multiple optical devices and then transform the position information into screen coordinates through different techniques. In the invention, the optical touch monitor is assumed to be a non-linear system, and a radial basis function (RBF) adapted to both large-scale and small-scale deformations is adopted for coordinates transformation in the optical touch monitor so as to achieve an ideal transformation result. In the invention, the affine transform function used for basic linear transformation is integrated with a non-linear RBF to provide a recapitulative description to non-linear transformation. Aforementioned "radial" is a very important concept, and which indicates that each touch position is a radial function and can be changed according to deformations of other surrounding points. Such a characteristic works very well for non-linear transformation. A basic non-linear transformation function F(u,v) is expressed as:

$$F(u, v) = a_0 + a_u u + a_v v + \sum_{i=1}^{N} c_i g((u, v), (u_i, v_i)) \quad (1)$$

In foregoing formula (1), (u, v) represents the coordinates of a touch point, $(u_i, y_i)$ represents the coordinates of a control point (CP) i, $c_i$ represents a weight coefficient, $g((u,v),(u_i,v_i))$ represents the distance between the touch point and the CP i, N represents the number of CPs, and $\alpha_0$, $\alpha_u$, and $\alpha_v$ are coefficients of the affine transform function. On the other hand, the RBF can be selected from following functions:

1. Gaussian Function:

$$\phi(r) = \exp(-\beta r^2), \beta > 0 \quad (2)$$

2. Multiquadric Function:

$$\phi(r) = \sqrt{r^2 + \beta^2}, \beta > 0 \quad (3)$$

3. Polyharmonic Spline Function:

$$\phi(r) = r^k, k=1,3,5,\ldots \quad (4)$$

$$\phi(r) = r^k \ln(r), k=2,4,6,\ldots \quad (5)$$

4. Thin Plate Spline (TPS) Function:

$$\phi(r) = \pm r^n \ln(r), n=1,2,3,\ldots \quad (6)$$

Through actual testing, it is found that TPS function is more adaptable to image registration or coordinates transformation compared to other RBFs. Thus, following embodiments will be described by taking a TPS function as an example. However, the invention is not limited herein, and other types of TPS functions or other RBFs may also be applied to the invention.

Figure 2:
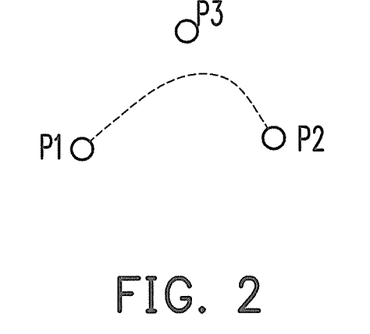
FIG. 2 illustrates an example of transforming coordinates by using a thin plate spline (TPS) function as a transformation model according to an embodiment of the invention.

FIG. 2 illustrates an example of transforming coordinates by using a TPS function as a transformation model according to an embodiment of the invention. Referring to FIG. 2, by using a TPS function as the transformation model, it is ensured that the calibrated CPs (for example, CPs P1 and P2)

can be correctly transformed between the detected touch position and the actual screen coordinates, and as to those touch points (for example, the touch point P3) other than the CPs, no major error will be produced under the affection of the calibrated CPs P1 and P2, which satisfies the non-linear system assumption.

Figure 3:
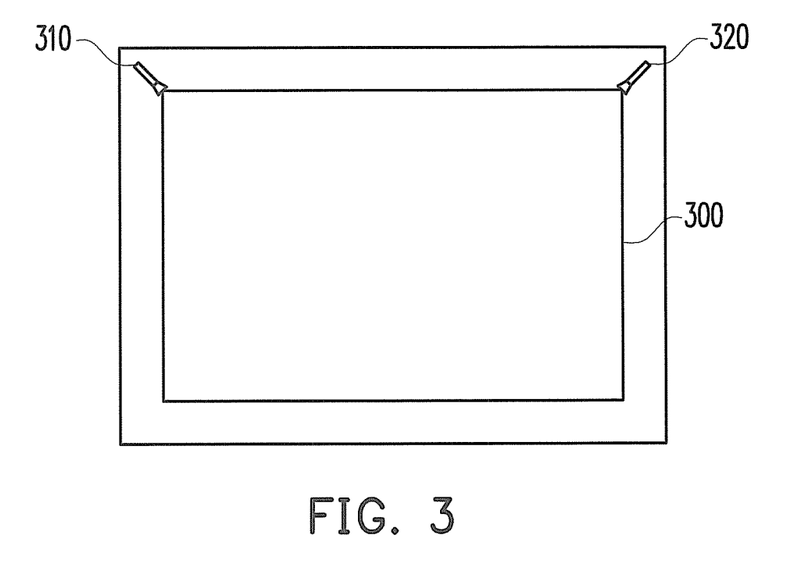
FIG. 3 is a diagram of an optical touch monitor according to an embodiment of the invention.
Figure 4:
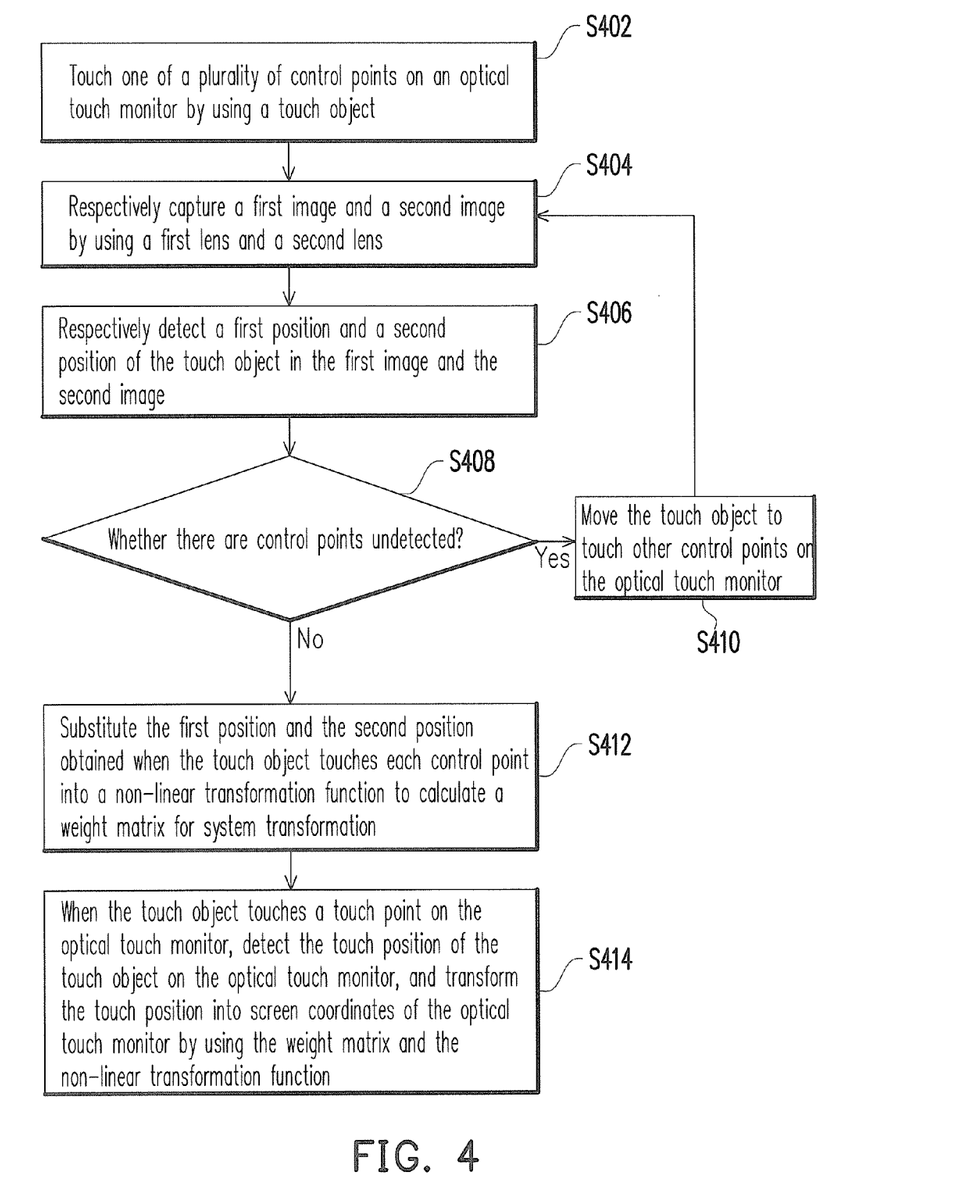
FIG. 4 is a flowchart of an accuracy calibration method according to an embodiment of the invention.

FIG. 3 is a diagram of an optical touch monitor according to an embodiment of the invention, and FIG. 4 is a flowchart of an accuracy calibration method according to an embodiment of the invention. Referring to both FIG. 3 and FIG. 4, the accuracy calibration method in the present embodiment is adapted to an optical touch monitor 300 having a first lens 310 and a second lens 320. The first lens 310 and the second lens 320 are disposed at the same side (for example, the upper left and right corners) of the optical touch monitor 300 and faced towards the other side (i.e., the lower two opposite corners) of the optical touch monitor 300. Below, the accuracy calibration method will be described in detail with reference to various components illustrated in FIG. 3.

First, one of a plurality of CPs on the optical touch monitor 300 is touched by using a touch object (step S402). Then, a first image and a second image are respectively captured by using the first lens 310 and the second lens 320 (step S404). Herein the CPs can be disposed at specific positions on the optical touch monitor 300 according to the physical characteristics of the optical touch monitor 300, so as to calibrate a touch position identified on the optical touch monitor 300.

Figure 5A:
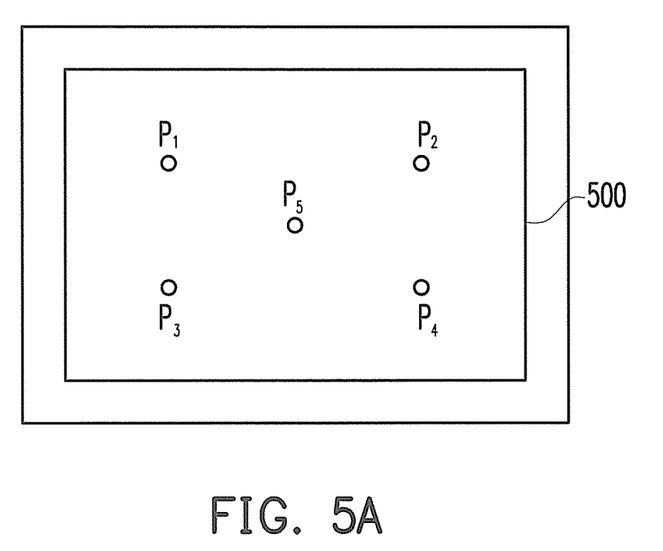
FIG. 5A and FIG. 5B are disposition diagrams of control points (CPs) according to an embodiment of the invention.
Figure 5B:
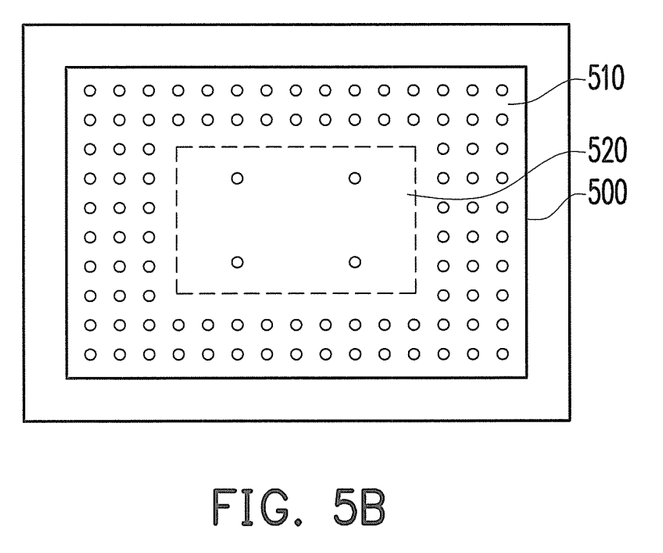

FIG. 5A and FIG. 5B are disposition diagrams of control points (CPs) according to an embodiment of the invention. FIG. 5A illustrates a disposition example of 5 CPs, wherein the CPs $P_1$-$P_5$ are respectively disposed at the upper left, upper right, bottom left, bottom right, and the center of the central area of the optical touch monitor 500 so as to cover the entire display area of the optical touch monitor 500. On the other hand, FIG. 5B illustrates a disposition example of 100 CPs, wherein because the optical touch monitor 500 has such a characteristic that the central area has higher accuracy while the peripheral area has lower accuracy, the optical touch monitor 500 is divided into a peripheral area 510 and a central area 520 for disposing the CPs, so that the density of the CPs distributed within the peripheral area 510 is greater than that of the CPs distributed within the central area 520 and an optimal calibration result can be obtained.

Next, a first position and a second position of the touch object in the first image and the second image are respectively detected (step S406). Herein an image processing (for example, rotation, shifting, or shear deformation) may be performed on the first image and the second image first to identify the touch object, and the coordinates of the touch object in the X direction of the first image and the second image may then be served as the first position and the second position.

Through foregoing image processing and touch object detection, the coordinates of the touch object in the two images are obtained. However, because the touch object is detected by using multiple optical devices in an optical system, only the abscissas (i.e., the x-values) of the touch object in the images are desired. Accordingly, in the present embodiment, the x-values of the touch object detected in the second image and the first image are respectively defined as u and v, the coordinates of the touch object in the image captured by using a camera is defined as p(u,v), the transformed coordinates thereof on the optical touch monitor 500 is defined as P(x,y), u is the x-value of the touch object in the second image, and v is the x-value of the touch object in the first image.

Figure 6A:
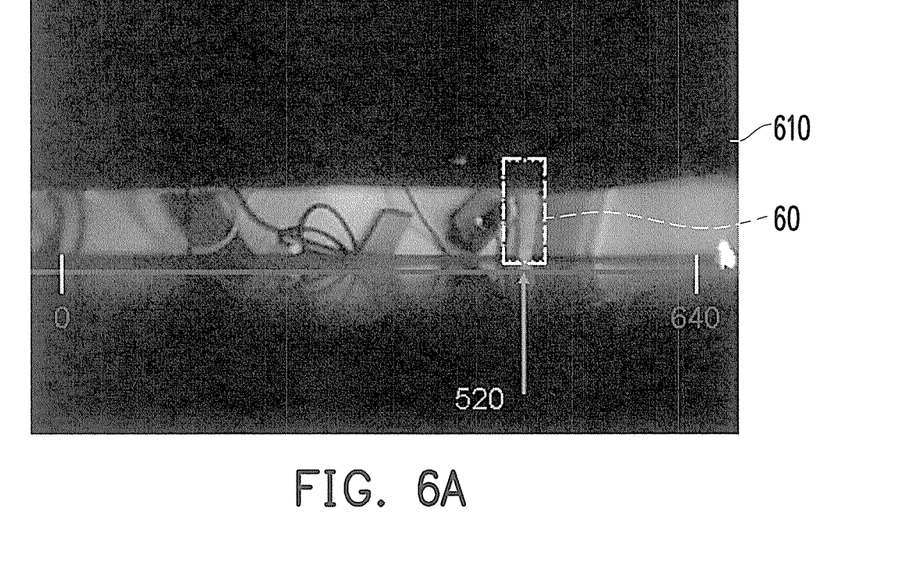
FIG. 6A and FIG. 6B illustrate an example of transforming coordinates by using a TPS function as a transformation model according to an embodiment of the invention.
Figure 6B:
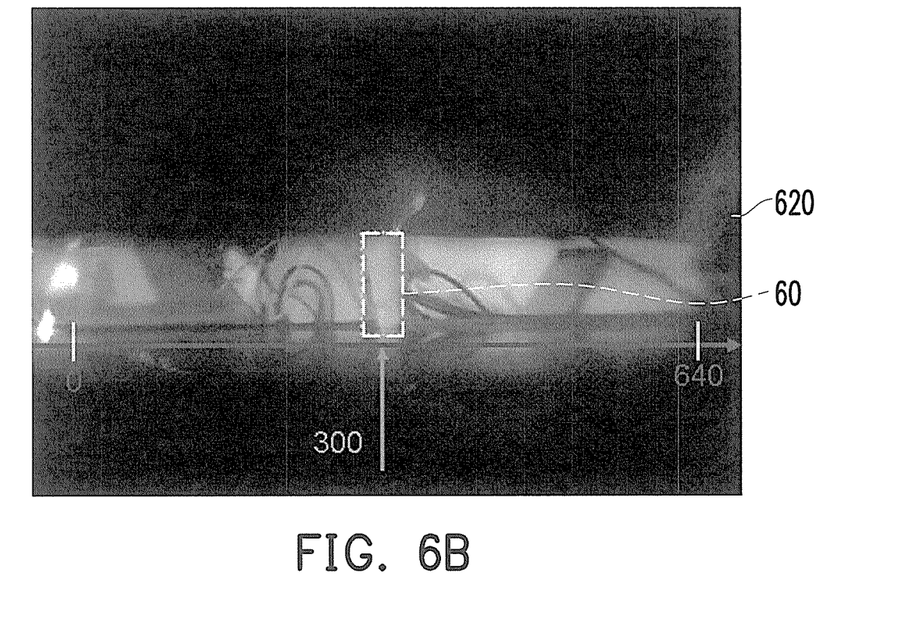

FIG. 6A and FIG. 6B illustrate an example of transforming coordinates by using a TPS function as a transformation model according to an embodiment of the invention. Referring to FIG. 6A and FIG. 6B, in the present embodiment, it is assumed that the width of the first image and the second image captured by the two lenses is 640 pixels, and since only the x-values of the touch object are desired, it is detected in the second image 610 in FIG. 6A that the touch object (herein a finger) is located at the 520$^{th}$ pixel. Accordingly, the value u in the coordinates p(u,v) of the touch object is set to 520. Next, it is detected in the first image 620 in FIG. 6B that the touch object (herein a finger) is located at the 300$^{th}$ pixel. Accordingly, the value v in the coordinates p(u,v) of the touch object is set to 300. After that, the two values are combined to obtain the touch position p(u,v) of the touch object as (520, 300).

It should be noted that whether there are still undetected CPs is determined after the detection of each CP is completed (step S408). Herein if there are still undetected CPs, the touch object is moved to touch other CPs on the optical touch monitor 300 (step S410), and the procedure returns to step S404 to execute steps S404 and S406 again, so as to obtain the first position and the second position of the touch object in the first image and the second image when the touch object touches each of the CPs.

If it is determined in step S408 that all the CPs have been detected, the first position and the second position obtained when the touch object touches each CP are substituted into a non-linear transformation function to calculate a weight matrix for system transformation (step S412). Herein the non-linear transformation function may include an affine transform function and a RBF, wherein the RBF may be a Gaussian function, a multiquadric function, a polyharmonic spline function, or a TPS function. However, the invention is not limited thereto.

To be specific, regarding the transformation of system coordinates, in the present embodiment, a TPS function is adopted for system coordinates transformation because the optical touch monitor 300 is a non-linear system. The TPS function is defined to be the product of the logarithm of the distance between any two sampling points and the n$^{th}$ power of the distance, wherein n is a positive integer. Below, the present embodiment will be described by assuming n=1. However, the invention is not limited thereto. When n=1, the mathematical model of the TPS function U is:

$$U = -r \ln r \qquad (7)$$

In foregoing formula (7), r is the distance between two CPs or the distance between a touch point and a CP.

On the other hand, in the present embodiment, the transformation between the coordinates p(u,v) of the touch object in the image captured by using a camera and the screen coordinates P(x,y) is expressed as:

$$P(x, y) = a_0 + a_u u + a_v v + \sum_{all} w U(p(u, v), p(u_c, v_c)) \qquad (8)$$

In foregoing formula (8), u is the x-value of the touch object in the second image, v is the x-value of the touch object in the first image, and $\alpha_0$, $\alpha_u$, and $\alpha_v$ are coefficients of the affine transform function. In the present embodiment, the distance between the coordinates p(u,v) of the touch object and the coordinates $p(u_c,v_c)$ of each CP is calculated. The distances are respectively substituted into the TPS function U and multiplied by the corresponding weight coefficients w.

The sum of the obtained results is the result of the RBF. The desired screen coordinates P(x,y) is obtained by adding foregoing sum to the affine transformation function (i.e., $\alpha_0 + \alpha_u + \alpha_v v$).

If foregoing transformation formula (8) is extended to all the CPs $p_i$ ($u_i, v_i$) of the optical touch monitor 300 (i=1, 2, 3 ... n, and n represents the number of the CPs), the formula (8) can be expressed in linear algebra as:

$$Y = LW \qquad (9)$$

In foregoing formula (9), Y is a spatial position matrix constructed on the screen coordinates P(x,y) of the touch point, and L is a combination of the TPS function K and an image position matrix P constructed on the touch position p(u,v) of the touch object. Herein K is a TPS matrix touch object constructed by substituting the distance between the touch position p(u,v) and the coordinates $p_i$ ($u_i, v_i$) of each CP into the TPS function U, and W is a weight matrix of system transformation.

Figure 7:
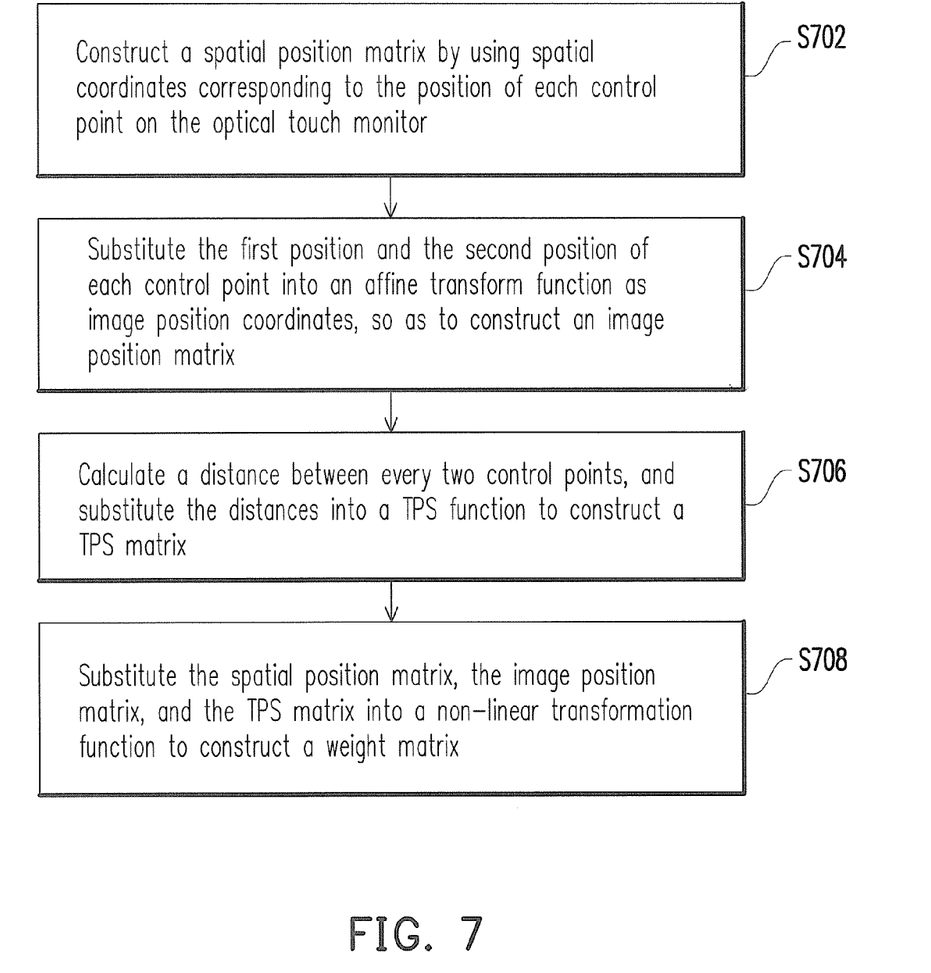
FIG. 7 is a flowchart of a weight matrix calculation method according to an embodiment of the invention.

FIG. 7 is a flowchart of a weight matrix calculation method according to an embodiment of the invention. Referring to FIG. 7, first, a spatial position transpose matrix $Y^T$ is constructed by using the spatial coordinates P(x,y) corresponding to the position of each CP on the optical touch monitor 300 (step S702), which is expressed as:

$$Y^T = \begin{bmatrix} x_1 & x_2 & x_n & 0 & 0 & 0 \\ y_1 & y_2 & \cdots & y_n & 0 & 0 & 0 \end{bmatrix}, 2 \times (n+3) \qquad (10)$$

In foregoing formula (10), n represents the number of CPs. By substituting the coordinates $P_i(x_i, y_i)$ (i=1, 2, 3 ... n) of the CPs on the optical touch monitor 300 into foregoing formula (10), a transpose matrix $Y^T$ having (n+3) columns and 2 rows is obtained.

Then, the first position v and the second position u of each CP are substituted into the affine transform function as image position coordinates, so as to construct an image position matrix P (step S704), which is expressed as:

$$P = \begin{bmatrix} 1 & u_1 & v_1 \\ 1 & u_2 & v_2 \\ \vdots & \vdots & \vdots \\ 1 & u_n & v_n \end{bmatrix}, n \times 3 \qquad (11)$$

In foregoing formula (11), ($u_i, v_i$) is the coordinates obtained by analyzing two images of a first CP captured by the first lens and the second lens, ($u_2, v_2$) is the coordinates obtained by analyzing two images of a second CP captured by the first lens and the second lens, ... , and ($u_n, v_n$) is the coordinates obtained by analyzing two images of an $n^{th}$ CP captured by the first lens and the second lens. By substituting foregoing coordinates into foregoing formula (11), a TPS matrix K having 3 columns and n rows is obtained.

Next, the distance r between every two CPs is calculated and substituted into the TPS function U, so as to construct a TPS matrix K (step S706), which is expressed as:

$$K = \begin{bmatrix} 0 & U(r_{12}) & \cdots & U(r_{1n}) \\ U(r_{21}) & 0 & \cdots & U(r_{2n}) \\ \vdots & \vdots & \ddots & \vdots \\ U(r_{n1}) & U(r_{n2}) & \cdots & 0 \end{bmatrix}, n \times n \qquad (12)$$

In foregoing formula (12), $r_{12}$ represents the distance between the first CP $P_1(u_1, v_1)$ and the second CP $P_2(u_2, v_2)$, and $U(r_{12})$ is the result obtained by substituting the distance $r_{12}$ into the TPS function U. As described above, by substituting all the distances between every two CPs into the TPS function U and substituting all the calculation results into foregoing formula (12), a TPS matrix K having n columns and n rows is obtained.

Eventually, the spatial position matrix Y, the image position matrix P, and the TPS matrix K are substituted into a non-linear transformation function to construct a weight matrix W (step S708). Herein a matrix L is obtained by filling the TPS matrix K, the image position matrix P, and the transpose matrix $P^T$ of the image position matrix P into a matrix having (n+3) columns and (n+3) rows, wherein O is a zero matrix. The matrix L is expressed as:

$$L = \begin{bmatrix} K | P \\ P^T | O \end{bmatrix}, (n+3) \times (n+3) \qquad (13)$$

The calculation formula of the weight matrix W is deduced from foregoing formula (9) as:

$$W = L^{-1} Y \qquad (14)$$

$$W = \begin{bmatrix} W_{u1} & W_{v1} \\ W_{u2} & W_{v2} \\ \vdots & \vdots \\ W_{un} & W_{vn} \\ a_{0x} & a_{0y} \\ a_{ux} & a_{uy} \\ a_{vx} & a_{vy} \end{bmatrix}, (n+3) \times 2$$

The weight matrix W can be obtained by substituting foregoing matrixes into the formula (14), and the weight matrix W can be used for transforming a touch position detected on the optical touch monitor 300 into the corresponding screen coordinates.

Referring to FIG. 4 again, in step S410, after obtaining the weight matrix W, when the touch object touches a touch point on the optical touch monitor 300, the touch position of the touch object on the optical touch monitor 300 is detected, and the touch position is transformed into screen coordinates of the optical touch monitor 300 by using the weight matrix and the non-linear transformation function (step S414). After foregoing calibration, the position p(u,v) where the touch object touches the optical touch monitor 300 can be transformed into screen coordinates P(x,y) of the optical touch monitor 300 by using the weight matrix, so as to obtain an accurate transformation result.

Figure 8:
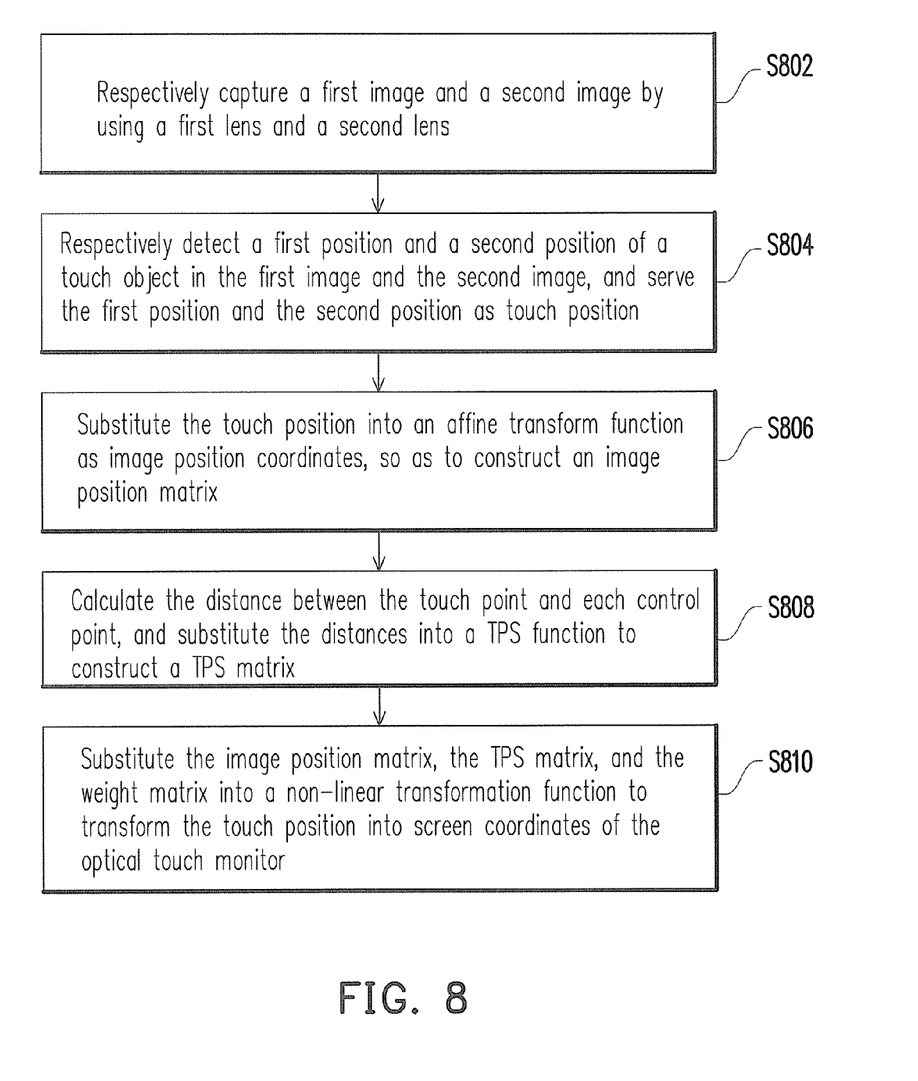
FIG. 8 is a flowchart of a coordinates transformation method according to an embodiment of the invention.

FIG. 8 is a flowchart of a coordinates transformation method according to an embodiment of the invention. Referring to FIG. 8, when the touch object touches the optical touch monitor 300, a first image and a second image are respectively captured by using the first lens 310 and the second lens 320 (step S802), and a first position and a second position of the touch object in the first image and the second image are respectively detected and served as a touch position (step S804).

Then, the touch position is substituted into an affine transform function as an image position coordinates, so as to construct an image position matrix (step S806), as expressed by foregoing formula (11). Next, the distance between the touch point and each CP is calculated and substituted into the TPS function to construct a TPS matrix (step S808), as expressed by foregoing formula (12).

Eventually, the image position matrix P, the TPS matrix K, and the weight matrix W are substituted into a non-linear transformation function to transform the touch position into a screen coordinates of the optical touch monitor 300 (step S810). Herein the TPS matrix K, the image position matrix P, and the transpose matrix $P^T$ of the image position matrix P can be filled into a matrix L, wherein O is a zero matrix. The screen coordinates Y transformed from the touch position is obtained by substituting the matrix L and the weight matrix W into foregoing formula (9).

Below, the procedure of calculating the weight matrix W and transforming the touch position by using the weight matrix W is described with reference to an example, wherein the feasibility of the accuracy calibration method provided by the invention is verified by using calculation results.

First, it is assumed that there are four CPs in a space, and the positions p(u,v) of these CPs are respectively:
p1=(299.329,63.1667);
p2=(115.125,192.172);
p3=(366.918,318.76);
p4=(543.596,120.167).

The spatial coordinates P(x,y) corresponding to these four CPs are respectively:
P1=(150,160);
P2=(150,610);
P3=(710,610);
P4=(710,160).

After substituting the information of the four CPs into formula (10) and formula (13), following spatial position matrix Y and matrix L are obtained:

$$Y = \begin{bmatrix} 150 & 160 \\ 150 & 610 \\ 710 & 610 \\ 710 & 160 \end{bmatrix}$$

$$L = \begin{bmatrix} 0 & -1.2179e+03 & -1.4745e+03 & -1.3858e+03 & 1 & 299.3290 & 63.1667 \\ -1.2179e+03 & 0 & -1.5898e+03 & -2.6391e+03 & 1 & 115.1250 & 192.1720 \\ -1.4745e+03 & -15898e+03 & 0 & -1.4840e+03 & 1 & 366.9180 & 318.76 \\ -1.3858e+03 & -2.6391e+03 & -1.4840e+03 & 0 & 1 & 543.596 & 120.167 \\ 1 & 1 & 1 & 1 & 0 & 0 & 0 \\ 299.3290 & 115.1250 & 366.9180 & 543.596 & 0 & 0 & 0 \\ 63.1667 & 192.1720 & 318.76 & 120.167 & 0 & 0 & 0 \end{bmatrix}$$

Eventually, the spatial position matrix Y and the matrix L are substituted into the non-linear transformation function $W=L^{-1}Y$ to obtain a weight matrix W:

$$W = \begin{bmatrix} -0.0554 & -0.0535 \\ 0.0449 & 0.0433 \\ -0.0322 & -0.0311 \\ 0.0427 & 0.0413 \\ -369.4002 & 322.7295 \\ 1.5948 & -0.731 \\ 1.7168 & 1.9033 \end{bmatrix}$$

Herein if the positions p(u,v) of the four CPs are substituted into the non-linear transformation function Y=LW again, the re-calculated spatial coordinates P'(x,y) of the four CPs are respectively obtained as:
P1'(x,y)=(150.000,160.000);
P2'(x,y)=(150.000,610.000);
P3'(x,y)=(710.000,610.000);
P4'(x,y)=(710.000,160.000).

According to foregoing calculation results, the four CPs can be correctly transformed between the image positions p(u,v) and the spatial coordinates P(x,y) through the non-linear transformation technique provided by the invention.

It should be noted that the accuracy calibration method described in foregoing embodiment is only applicable to a system having two lenses. However, due to the characteristic of optical touch monitor, the closer a touch point is located to the two lenses, the less accurately it will be identified. In particular, the distance of a touch point cannot be correctly detected when the touch point is located on the line connecting the two lenses. The invention provides a solution to resolve this problem. The solution is, besides disposing optical lenses at two corners of an upper portion of an optical touch monitor, optical lenses are also disposed at two corners of a lower portion of the optical touch monitor, and position transformations regarding the upper portion and the lower portion of the optical touch monitor are respectively calibrated by using the accuracy calibration method provided by the invention.

Figure 9:
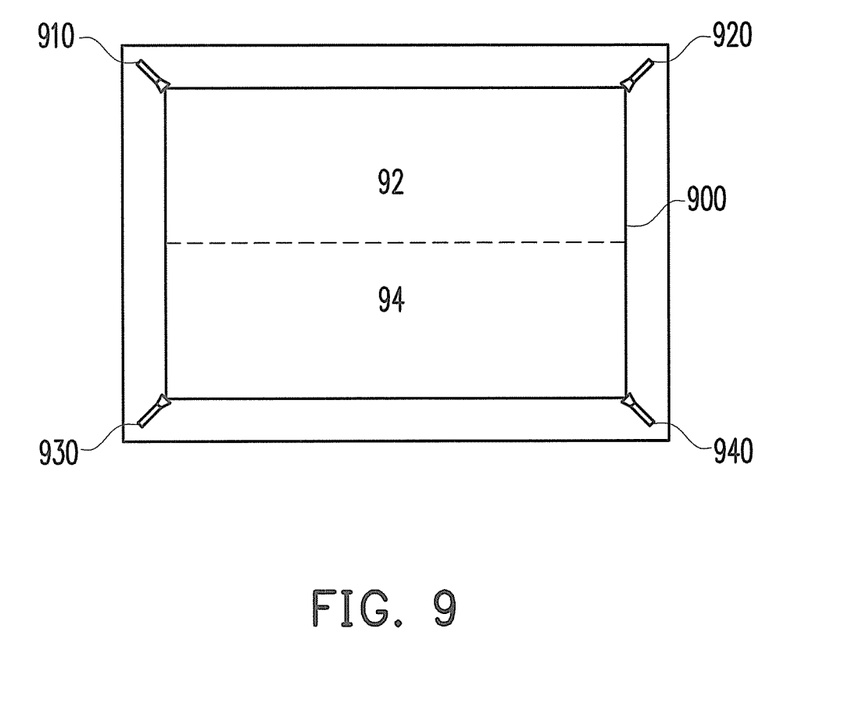
FIG. 9 is a diagram of an optical touch monitor according to an embodiment of the invention.

FIG. 9 is a diagram of an optical touch monitor according to an embodiment of the invention. Referring to FIG. 9, in the present embodiment, a first lens 910 and a second lens 920 are respectively disposed at two corners of the upper portion 92 of the optical touch monitor 900 for detecting and calibrating a touch position of a touch object on the lower portion 94 of the optical touch monitor 900. Additionally, in the present embodiment, a third lens 930 and a fourth lens 940 are further disposed at two corners of the lower portion 94 of the optical touch monitor 900 for detecting and calibrating a touch position of the touch object on the upper portion 92 of the optical touch monitor 900. The problem of low accuracy in lens detection can be effectively resolved through the lens disposition described above.

In summary, the invention provides a method for calibrating the accuracy of an optical touch monitor, wherein a touch position detected on the optical touch monitor is transformed by using a non-linear transformation function, and a weight matrix used for the non-linear transformation is calculated and calibrated in advance by using a plurality of CPs, so that the accuracy of the transformation result is improved, and along with the increase in the number of CPs, a transformation result more adapted to the actual situation can be obtained.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for calibrating accuracy of an optical touch monitor, wherein the optical touch monitor has a first lens and a second lens, the first lens and the second lens are disposed at a same side of the optical touch monitor and faced towards another side of the optical touch monitor, the method comprising:

touching one of a plurality of control points (CPs) on the optical touch monitor by using a touch object;

respectively capturing a first image and a second image by using the first lens and the second lens;

respectively detecting a first position and a second position of the touch object in the first image and the second image;

moving the touch object to touch the other CPs on the optical touch monitor, and repeating foregoing steps to obtain the first position and the second position of the touch object in the first image and the second image when the touch object touches each of the CPs; and substituting the first position and the second position of the touch object obtained when the touch object touches each of the CPs into a non-linear transformation function to calculate a weight matrix for system transformation, wherein the non-linear transformation function comprises a affine transform function and a radial basis function (RBF); and when the touch object touches a touch point on the optical touch monitor, detecting a touch position of the touch object on the optical touch monitor, and transforming the touch position into screen coordinates of the optical touch monitor by using the weight matrix and the non-linear transformation function, wherein the weight matrix is expressed as:

$$W = L^{-1} Y,$$

Y is a spatial position matrix, and L is a combination matrix of a radial basis matrix and an image position matrix, wherein the combination matrix is expressed as:

$$L = \begin{bmatrix} K | P \\ P^T | O \end{bmatrix},$$

K is the radial basis matrix and expressed as:

$$K = \begin{bmatrix} 0 & U(r_{12}) & \cdots & U(r_{1n}) \\ U(r_{21}) & 0 & \cdots & U(r_{2n}) \\ \vdots & \vdots & \ddots & \vdots \\ U(r_{n1}) & U(r_{n2}) & \cdots & 0 \end{bmatrix},$$

r is a distance between every two of the CPs, and U is the RBF,

P is an image position matrix and expressed as:

$$P = \begin{bmatrix} 1 & u_1 & v_1 \\ 1 & u_2 & v_2 \\ \vdots & \vdots & \vdots \\ 1 & u_n & v_n \end{bmatrix},$$

u is the x-value of the touch object in the second image, and v is the x-value of the touch object in the first image, $P^T$ is a spatial position transpose matrix, and O is a zero matrix.

2. The method according to claim 1, wherein the step of substituting the first position and the second position of the touch object obtained when the touch object touches each of the CPs into the non-linear transformation function to calculate the weight matrix for system transformation comprises:

constructing the spatial position matrix by using spatial coordinates corresponding to positions of the CPs on the optical touch monitor;

substituting the first position and the second position of each of the CPs into the affine transform function as image position coordinates to construct the image position matrix;

calculating the distance between every two of the CPs, and substituting the distances into the RBF to construct the radial basis matrix; and substituting the spatial position matrix, the image position matrix, and the radial basis matrix into the non-linear transformation function to obtain the weight matrix.

3. The method according to claim 1, wherein the step of detecting the touch position of the touch object on the optical touch monitor and transforming the touch position into the screen coordinates of the optical touch monitor by using the weight matrix and the non-linear transformation function when the touch object touches the touch point on the optical touch monitor comprises:

respectively capturing the first image and the second image by using the first lens and the second lens;

respectively detecting the first position and the second position of the touch object in the first image and the second image as the touch position;

substituting the touch position into the affine transform function as image position coordinates to construct the image position matrix;

calculating the distance between the touch point and each of the CPs, and substituting the distances into the RBF to construct the radial basis matrix; and substituting the image position matrix, the radial basis matrix, and the weight matrix into the non-linear transformation function to transform the touch position into the screen coordinates of the optical touch monitor.

4. The method according to claim 1, wherein the RBF comprises a Gaussian function, a multiquadric function, a polyharmonic spline function, or a thin plate spline (TPS) function.

5. The method according to claim 4, wherein if the RBF is the TPS function, the TPS function is a product of a logarithm of a distance between any two sampling points and an nth power of the distance, wherein the two sampling points comprise the CP or the touch point, and n is a positive integer.

6. The method according to claim 1, wherein the first lens and the second lens are disposed at two corners of the same side of the optical touch monitor.

7. The method according to claim 1, wherein the optical touch monitor further comprises a third lens and a fourth lens, the first lens and the second lens are disposed at two corners of an upper portion of the optical touch monitor for detecting and calibrating the touch position of the touch object on a lower portion of the optical touch monitor, and the third lens and the fourth lens are disposed at two corners of the lower portion of the optical touch monitor for detecting and calibrating the touch position of the touch object on the upper portion of the optical touch monitor.

8. The method according to claim 1, wherein the CPs are distributed within a peripheral area and a central area of the optical touch monitor, and a first density of the CPs in the peripheral area is greater than a second density of the CPs in the central area.

9. The method according to claim 1, wherein the step of respectively detecting the first position and the second position of the touch object in the first image and the second image comprises:
    identifying the touch object in the first image and the second image; and
    serving coordinates of the touch object in an X direction in the first image and the second image as the first position and the second position.

10. The method according to claim 9, wherein the step of identifying the touch object in the first image and the second image comprises:
    performing an image processing on the first image and the second image to identify the touch object, wherein the image processing comprises one or a combination of rotation, shifting, and shear deformation.

\* \* \* \* \*